(12) United States Patent
Kim et al.

(10) Patent No.: US 9,279,052 B2
(45) Date of Patent: *Mar. 8, 2016

(54) THERMOPLASTIC POLYESTER ELASTOMER RESIN COMPOSITION AND MOLDING ARTICLES COMPRISING THE SAME

(71) Applicant: LG CHEM, LTD., Seoul (KR)

(72) Inventors: Ho Dong Kim, Daejeon (KR); Sang Wook Na, Daejeon (KR); A Young Hur, Daejeon (KR); Soo Min Lee, Daejeon (KR); Sung Tae Ahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/425,263

(22) PCT Filed: Jun. 18, 2014

(86) PCT No.: PCT/KR2014/005372
§ 371 (c)(1),
(2) Date: Mar. 2, 2015

(87) PCT Pub. No.: WO2014/204210
PCT Pub. Date: Dec. 24, 2014

(65) Prior Publication Data
US 2015/0267049 A1  Sep. 24, 2015

(30) Foreign Application Priority Data
Jun. 19, 2013 (KR) .................. 10-2013-0070294

(51) Int. Cl.
C08L 67/02 (2006.01)
C08G 63/66 (2006.01)
C08L 67/00 (2006.01)
C08L 51/00 (2006.01)

(52) U.S. Cl.
CPC .............. *C08L 67/025* (2013.01); *C08G 63/66* (2013.01); *C08L 51/003* (2013.01); *C08L 67/00* (2013.01); *C08L 2201/08* (2013.01); *C08L 2205/03* (2013.01); *C08L 2207/04* (2013.01)

(58) Field of Classification Search
CPC . C08L 67/025; C08L 51/003; C08L 2201/08; C08L 2207/04; C08L 2205/03; C08L 67/00; C08G 63/66
See application file for complete search history.

(56) References Cited

U.S. PATENT DOCUMENTS 8,716,382 B2 * 5/2014 Na et al. .................. 524/258
2001/0041772 A1 * 11/2001 Masubuchi et al. ........... 525/107
2009/0208720 A1 * 8/2009 Miyamoto et al. ............. 428/220

FOREIGN PATENT DOCUMENTS

| CN | 102010483 | * | 4/2011 |
|---|---|---|---|
| JP | 09-254242 A | | 9/1997 |
| JP | 2010-254973 A | | 11/2010 |
| JP | 2011-074305 A | | 4/2011 |
| KR | 10-2009-0062785 A | | 6/2009 |
| KR | 10-2011-0006103 A | | 1/2011 |
| KR | 10-2013-0124186 A | | 11/2013 |

* cited by examiner

*Primary Examiner* — Robert Jones, Jr.
(74) *Attorney, Agent, or Firm* — Dentons US LLP

(57) ABSTRACT

Disclosed are a thermoplastic polyester elastomer resin composition and a molded article comprising the same. More specifically, disclosed is a thermoplastic polyester elastomer resin composition which comprises a glycidyl-modified ethylene-octene copolymer resin, as a chain extension/hydrolysis resistance agent for blown and extrusion molding to improve melt viscosity, and increases a molecular weight through reaction extrusion and thus exhibits superior heat resistance, weather resistance, heat aging resistance, hydrolysis resistance, fatigue resistance, melt viscosity and parison stability, and in particular, exhibits superior blow molding, causes no gelation, and reduces production of odor-causing substances such as volatile organic compounds (TVOC) during blow molding, thereby making a balance between physical properties, molding property and operation environments.

17 Claims, No Drawings

THERMOPLASTIC POLYESTER ELASTOMER RESIN COMPOSITION AND MOLDING ARTICLES COMPRISING THE SAME

This application is a National Stage Entry of International Application No. PCT/KR2014/005372, filed Jun. 18, 2014, and claims the benefit of Korean Application No. 10-2013-0070294 filed on Jun. 19, 2013, all of which are hereby incorporated by reference in their entirety for all purposes as if fully set forth herein.

TECHNICAL FIELD

The present invention relates to a thermoplastic polyester elastomer resin composition and a molded article comprising the same. More specifically, the present invention relates to a thermoplastic polyester elastomer resin composition which exhibits superior flexibility, elasticity, heat resistance, heat aging resistance, hydrolysis resistance and fatigue resistance, and in particular, improved blow molding property, causes no gelation, remarkably reduces formation of an odor-causing substance during molding, and is thus applicable to extrusion and blow molding in automobile, electrical and industrial fields by introducing a glycidyl-modified ethylene-octene copolymer (EOR-GMA) as a chain extension/hydrolysis resistance agent, and a molded article comprising the same.

BACKGROUND ART

A conventional thermoplastic polyester elastomer (hereinafter, referred to as "TPEE") has been used for electrical, electric, automobile, industrial and various precision parts and the like due to superior heat resistance, chemical resistance, dimensional stability and flexibility. In recent years, plasticizing is underway in the automobile field due to weight reduction and TPEE is utilized in blow-molded articles such as air ducts, constant velocity joint boots, rack & pinion boots and bellows.

TPEE is widely used in electric/electrical, automobile and industrial fields due to superior low-temperature impact properties and excellent oil resistance, chemical resistance and mechanical properties and is an elastomer used for engineering-based parts, together with a thermoplastic urethane elastomer and a thermoplastic polyamide elastomer. A representative example of the TPEE is a polyetherester-based block copolymer resin composition and TPEE is generally prepared by a melt polycondensation process.

In particular, parts such as automobile air ducts, constant velocity joint boots and various bellows should have optimum melt viscosity and melt tension in a melt state, since they are produced by blowing melt TPEE. In addition, the parts are generally known to be produced by reaction extrusion of a TPEE-based resin obtained by melt polymerization, since it should have a parison property in which a thickness distribution of a molded article is uniform during blowing.

Because general TPEE is inapplicable to blowing due to low melt viscosity and low melt tension in a melt state, there is a limitation in obtaining a polymer having a sufficiently high melt viscosity when the polymer is produced by melt polycondensation. In addition, although a polymer is prepared by performing melt polycondensation for a predetermined time, in many cases, physical properties of the polymer are deteriorated. Accordingly, an attempt to improve melt viscosity of TPEE was actively made for a long time. Japanese Patent Publication Sho. 49-13297 discloses a solid-state polymerization method to increase a polymerization degree of TPEE obtained by melt polymerization. The obtained resin greatly depends on a retention time of melt viscosity and involves great variation in molding conditions upon re-molding after molding, thus disadvantageously requiring control.

In addition, an attempt to increase melt viscosity to a level, enabling blow molding, by blending TPEE with a cross-linking agent or a chain extender was made. In a case in which an isocyanate-based compound is used as a chain transfer agent, it is not easy to control reaction during reaction extrusion and to handle and store the reaction product in a liquid phase due to excessively high reaction velocity of isocyanate with moisture, reactivity is deteriorated due to reaction with moisture and it is not easy to control difference in physical properties between lots during extrusion reaction (see Japanese Patent Publication Sho 52-121699, Japanese Patent Publication Sho 57-78413, Japanese Patent Publication No. 2005-325220, U.S. Pat. No. 5,733,986 and the like).

In addition, when a carbodiimide compound (referred to as polycarbodiimide compound having two or more $N=C=N$— units in a molecule) is used, a great amount of expensive polycarbodiimide compound should be used so as to obtain high melt viscosity and parison stability. In particular, an operation environment is not preferred because of unique odor derived from a high content of volatile organic compounds during a molding operation upon chain extension by extrusion reaction between a polyester resin and an imide group (see Japanese Patent Publication No. 2011-94000).

In addition, when an epoxy resin is used, reactivity is greatly changed according to epoxy equivalents and the number of functional groups, and there are problems associated with reactivity and handling such as dispersion of an epoxy resin in a resin and effects of moisture during storage (see Japanese Patent Publication No. 11-323110, Japanese Patent Publication No. 2000-239354, Japanese Patent Publication No. 2000-355650 and Japanese Patent Publication No. 2001-247752).

Furthermore, when an oxazoline compound is used, an effect on improvement in molecular weight may be deteriorated due to low reactivity as compared to an isocyanate compound, an epoxy resin and a carbodiimide compound.

DISCLOSURE

Technical Problem

Therefore, the present inventors have continuously researched solutions to the problems of the prior art. As a result, it is an object of the present invention to provide a thermoplastic polyester elastomer resin composition which exhibits superior mechanical properties, heat aging resistance and durability, has an improved melt viscosity to provide optimal blow molding and parison stability, causes no gelation and contains a less odor-causing substance during molding.

Technical Solution

In accordance with one aspect of the present invention, the above and other objects can be accomplished by the provision of a thermoplastic polyester elastomer resin composition comprising a copolyetherester elastomer resin and a glycidyl-modified ethylene-octene copolymer (EOR-GMA, ethylene-octene rubber-glycidyl methacrylate) as a chain transfer/hydrolysis resistance agent.

In accordance with another aspect of the present invention, provided is a molded article produced from the thermoplastic polyester elastomer resin composition.

Hereinafter, the present invention will be described in detail.

The present invention has a technical feature that a certain thermoplastic polyester elastomer resin is combined with a certain chain transfer/hydrolysis resistance agent. For reference, as herein used, the term "chain extension/hydrolysis resistance agent" refers to an additive serving as a chain extender and a hydrolysis resistance agent, unless specifically mentioned otherwise.

In a specific example, the thermoplastic polyester elastomer resin composition of the present invention comprises a copolyetherester elastomer resin, a polyalkylene dicarboxylate-based resin and a glycidyl-modified ethylene-octene copolymer (EOR-GMA) as a chain transfer/hydrolysis resistance agent.

For example, the copolyetherester elastomer resin is obtained by melt-polymerizing aromatic dicarboxylic acid or an ester-forming derivative thereof, a lower aliphatic diol and polyalkylene oxide and solid-polymerizing the product. In a specific example, the resin is a random copolymer of a hard fraction produced from aromatic dicarboxylic acid or an ester-forming derivative thereof and aliphatic diol and of a soft fraction containing polyalkylene oxide as a main component.

The copolyetherester elastomer resin thus obtained is present in an amount of 85 to 97% by weight or 90 to 95% by weight in the composition. Within this range, physical properties, long-term durability reliability and molding property suitable for automobile blowing application can be obtained.

For example, the aromatic dicarboxylic acid comprises terephthalic acid (TPA), isophthalic acid (IPA), 2,6-naphthalene dicarboxylic acid (2,6-NDCA), 1,5-naphthalene dicarboxylic acid (1,5-NDCA), dimethyl terephthalate (DMT) {aromatic dicarboxylate in which 1,4-cyclohexane dicarboxylic acid (1,4-CHDA) and diacid are substituted by a dimethyl group}, dimethyl isophthalate (DMI), 2,6-dimethyl naphthalene dicarboxylate (2,6-NDC), dimethyl 1,4-cyclohexane dicarboxylate (DMCD) or a mixture thereof. In a specific example, the aromatic dicarboxylic acid may be DMT.

For example, it is preferred in view of reaction balance that the aromatic dicarboxylic acid is present in an amount of 40 to 70% by weight, 45 to 70% by weight or 45 to 65% by weight.

In addition, the aliphatic diol comprises, for example, a diol having a number average molecular weight (Mn) of 300 g/mol or less, that is, at least one of ethylene glycol, propylene glycol, 1,2-propanediol, 1,3-propanediol, 1,4-butanediol (1,4-BG), 1,5-pentanediol, 1,6-hexanediol and 1,4-cyclohexanedimethanol (1,4-CHDM). In a specific example, the aliphatic diol is 1,4-butanediol.

In view of reaction balance, the aliphatic diol is preferably used in an amount of 20 to 40% by weight, 25 to 40% by weight or 25 to 35% by weight.

The polyalkylene oxide may be a unit constituting a soft fraction and contain aliphatic polyether as a component.

For example, the polyalkylene oxide comprises at least one of polyoxyethylene glycol, polypropylene glycol, poly(tetramethylene ether)glycol (PTMEG), polyoxyhexamethylene glycol, a copolymer of ethylene oxide and propylene oxide, an ethylene oxide addition polymer of poly(propylene oxide) glycol, and a copolymer of ethylene oxide and tetrahydrofuran. Specifically, the polyalkylene oxide is PTMEG, in particular, PTMEG having a number average molecular weight (Mn) of 600 to 3,000 g/mol, 1,000 to 2,500 g/mol or 1,500 to 2,200 g/mol.

The copolyetherester elastomer resin may comprise an additive. For example, melt viscosity and melt tension of the elastomer resin can be improved by using a branching agent.

Examples of the branching agent include, but are not limited to glycerol, pentaerythritol, trimellitic anhydride, trimellitic acid, trimethylol propane, neopentyl glycol and combinations thereof. In a specific example, the branching agent is trimellitic anhydride.

It is preferred that a content of the branching agent in the elastomer resin is 0.05 to 0.1% by weight, 0.05 to 0.09% by weight or 0.06 to 0.09% by weight, because melt viscosity of the elastomer resin is controlled by increasing melt viscosity and as a result, control of inherent viscosity during melt polymerization is easy.

For example, the copolyetherester elastomer resin of the present invention may be obtained by melt polycondensation, followed by solid polymerization.

In a specific example, aromatic decarboxylic acid, aliphatic diol and polyalkylene oxide are subjected to ester interexchange reaction in the presence of titanium butoxide (TBT) as a catalyst at 140 to 215° C. for about 120 minutes to produce a BHBT (bis(4-hydroxy)butyl terephthalate) oligomer, the TBT catalyst is added again and melt polycondensation reaction is performed at 215° C. to 245° C. for 120 minutes under stepwise reduction in pressure from 760 torr to 0.3 torr.

The melt polycondensation reaction may be performed until a melt flow index (MFI) measured at 230° C. and at a load of 2.16 kg in accordance with ASTM D-1238 reaches 20 g/10 min. Upon completion of the reaction, the reaction product is discharged under a nitrogen pressure from the reactor and is then pelletized by strand pelletizing.

Then, the pellet is subjected to solid polymerization in a solid polymerization reactor or a rotary vacuum drier at a temperature of 140 to 200° C. for about 10 to 24 hours under an inert air current such as high-vacuum nitrogen. A pressure is not particularly limited, but is preferably atmospheric pressure.

The solid polymerization enables an increase in viscosity until a melt flow index (MFI) measured at 230° C. and a load of 2.16 kg in accordance with ASTM D-1238 reaches 10 g/10 min or less, 1 to 10 g/10 min (230° C., 2.16 kg), or 3 to 8 g/10 min (230° C., 2.16 kg). For reference, when the melt flow index is higher than 10 g/10 min, an excess amount of the chain transfer/hydrolysis resistance agent described later may be required, glycidyl groups may remain during reaction extrusion, thus causing quality non-uniformity and problems associated with molding.

In a specific example, the copolyetherester elastomer resin is obtained using poly(tetramethylene ether)glycol having a number average molecular weight (Mn) of 600 to 3,000 g/mol.

In another specific example, the copolyetherester elastomer resin is obtained using polypropylene glycol having a number average molecular weight (Mn) of 2,000 to 3,000 g/mol and an end-capped with ethylene oxide.

A hardness of the copolyetherester elastomer resin is represented as Shore hardness (D) and is determined by the content of polyalkylene oxide.

Polyalkylene oxide is used in an amount of 10 to 50% by weight, 15 to 50% by weight or 15 to 45% by weight in order to adjust the Shore hardness to 35 to 50 D, or 40 to 500. Within this range, the hardness of copolyetherester elastomer resin is low, flexibility is excellent and heat resistance and compatibility of the resin are thus superior.

The glycidyl-modified ethylene-octene copolymer (EOR-GMA) functions to increase melt viscosity and melt tension, extend chains during reaction extrusion (increase molecular weight) and reduce odor. For example, the glycidyl-modified ethylene-octene copolymer may be an ethylene-octene copolymer modified by grafting with glycidyl methacrylate. A graft content of glycidyl methacrylate may be 8 to 20% by weight, 8 to 15% by weight or 8 to 10% by weight.

The glycidyl-modified ethylene-octene copolymer may be present in an amount of 2 to 10% by weight, 2 to 8% by weight or 2 to 5% by weight in the composition. Since a high melt viscosity can be obtained within this range, a melt flow index which is the most suitable for blowing and extrusion can be obtained, molding problems such as melt fracture do not occur due to suitable melt viscosity, there is no difference between lots caused by remaining glycidyl groups, molding is uniform during retention, and long-term durability reliability, appearance of blow-molded articles, die swell and thermal stability may be excellent.

In addition, the glycidyl-modified ethylene-octene copolymer (EOR-GMA) is a resin having a melt flow index (MFI) of 1 to 5 g/10 min (190° C., 2.16 kg) or 2 to 4 g/10 min (190° C., 2.16 kg), a derivative thereof or a mixture thereof.

The composition may further comprise 1 to 5% by weight, 1 to 4% by weight or 2 to 4% by weight of an anti-heat aging agent, so as to provide long-term heat aging resistance as an inherent property of the resin, as well as long-term high-temperature heat aging resistance implemented by heat stabilizer, antioxidant or the like, while taking into consideration automobile, electrical, electronic and industrial blowing and extrusion applications.

For example, the anti-heat aging agent comprises at least one selected from the group consisting of a hindered phenol-based antioxidant, a diphenylamine-based antioxidant, a metal complex compound, an antioxidant and a hindered amine-based light stabilizer.

In a specific example, the anti-heat aging agent comprises, as a primary antioxidant, N,N'-hexane-1,6-diylbis(3-(3,5-di-tert-butyl-4-hydroxyphenyl)propionamide) which is a type of hindered phenol-based anti-heat aging agent and as a secondary antioxidant and a long-term heat-resistance aging stabilizer, 4,4'-bis($\alpha,\alpha$-dimethylbenzyl)diphenylamine which is a type of diphenyl amine-based stabilizer.

As a long-term heat-resistance aging stabilization aid, poly[[6-(1,1,3,3-tetramethylbutyl)amino]-1,3,5-triazine-2,4-diyl]][(2,2,6,6-tetramethyl-4-piperidinyl)imino]-1,6-hexanediyl[(2,2,6,6-tetramethyl-4-piperidinyl)imino]) which is a type of high-molecular weight hindered amine-based light stabilizer or nickel N,N-dibutyldithiocarbamate may be used.

When the afore-mentioned additive is used in combination, it contributes to improvement in long-term heat aging resistance and durability owing to synergistic effects than when it is used alone. According to application, at least one of a flame retardant, a lubricant, a hydrolysis stabilizer, a metal inactivating agent, a pigment, a colorant, an antistatic agent, a conductive agent, an EMI shielding agent, a magnetization agent, a cross-linking agent, an antibacterial agent, a processing aid, an anti-abrasion agent, and a carbon black master batch may be used in amounts that have no negative effects on physical properties.

The thermoplastic polyester elastomer resin composition according to the present invention may further comprise a polyalkylene dicarboxylate-based resin. In addition, for example, the polyalkylene dicarboxylate-based resin is obtained by melt polymerization of aromatic decarboxylic acid and aliphatic lower diol, followed by solid polymerization.

In a specific example, the polyalkylene dicarboxylate-based resin may comprise at least one selected from polybutylene terephthalate, polyethylene terephthalate, polycyclohexylene dimethylene terephthalate, polyethylene naphthalate, polybutylene naphthalate and polytrimethylene terephthalate.

The polyalkylene dicarboxylate-based resin can be obtained as a high molecular weight resin by placing a low-molecular weight pellet obtained by melt polymerization in a solid polymerization reactor and performing reaction at 190 to 210° C. under a high vacuum and in an inert state, as described in the solid polymerization of the copolyetherester elastomer resin.

A viscosity of the polyalkylene dicarboxylate-based resin is increased until a melt flow index (MFI) measured at 250° C. and a load of 2.16 kg in accordance with ASTM D-1238 reaches 1 to 5 g/10 min or 3 to 5 g/10 min. When the melt flow index is higher than 5 g/10 min, an excess amount of the chain transfer/hydrolysis resistance agent described later may be required, residual glycidyl groups may be present during reaction extrusion, and quality non-uniformity, problems associated with molding and necessity of long reaction extrusion time may be caused. For reference, when the melt flow index is lower than 3 g/10 min, glycidyl groups may be thus left behind after reaction extrusion, since terminal carboxyl and hydroxyl groups of polyalkylene dicarboxylate-based resin which react with the chain transfer/hydrolysis resistance agent are insufficient, and uniform product quality during blow molding cannot be obtained.

The polyalkylene dicarboxylate-based resin thus obtained may be present in an amount of 1 to 30 parts by weight, 5 to 25 parts by weight or 10 to 20 parts by weight, based on 100 parts by weight in total of the composition. Within this range, flexural properties, heat resistance, and long-term durability reliability of the final resin are excellent.

In addition, the present invention provides a molded article produced from the thermoplastic polyester elastomer resin composition. The molded article may be obtained by blow molding or extrusion molding.

The molded article may be a blow- or extrusion-molded article for automobile, electrical, electronic and industrial applications and in a specific example, may be a blow-molded article such as constant velocity joint boot, air duct, rack & pinion boot or bellows for automobiles, or may be an extrusion molded article such as cable coating, wire coating, tube, sheet, hose or film.

For example, a method for producing a molded article using the thermoplastic polyester elastomer resin composition is given as follows.

In accordance with the method described above, a copolyetherester elastomer resin is prepared and added to a twin-screw extruder, and a glycidyl-modified ethylene-octene copolymer (EOR-GMA) as a chain transfer/hydrolysis resistance agent, and a heat anti-aging stabilizer are added thereto and a polyalkylene dicarboxylate resin is added, if necessary, followed by extrusion. The resulting product has superior molding property, physical properties and appearance, causes no gelation and reduces formation of odor-causing substances during operation.

Advantageous Effects

The thermoplastic polyester elastomer resin composition according to an embodiment of the present invention has high melt viscosity, and exhibits superior parison stability, long-term heat aging resistance, hydrolysis resistance and appearance, causes no gelation and considerably reduces formation of odor-causing substances during operation, thus being suitable for use in blowing components such as air ducts of automobile underhoods, constant velocity joint boots and various bellows, and extrusion components such as electrical, electronic and industrial films, sheets, tubes, hoses and wire harnesses.

BEST MODE

Now, the present invention will be described in more detail with reference to the following examples. These examples are provided only to illustrate the present invention. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

EXAMPLE

Resin Preparation Example

1. Preparation of TPEE-A and TPEE-B Resins 25 to 50% by weight of DMT, 15 to 30% by weight of 1,4-butanediol and 25 to 50% by weight of PTMEG having a number average molecular weight of 1,000 to 2,000 g/mol were added to an ester interchange reactor and 0.03% by weight of TBT was added thereto as a catalyst. Temperature was elevated from 140° C. to 215° C. for 120 minutes, the reaction was further performed for 60 minutes while maintaining 215° C., and reaction was stopped when a reaction ratio (calculated from an amount of methanol as a reaction effluence) reached 90% or more.

Then, the resulting oligomer was placed in a polycondensation reactor, 0.08% by weight of TBT as a catalyst, 0.03 to 0.04% by weight of TMA as a chain extender and 0.14 to 0.15% by weight of a hindered phenol-based antioxidant, and 0.15 to 0.2% by weight of an aromatic amine-based antioxidant or a sulfur-based stabilizer were added to the reactor, melt polycondensation reaction was performed while elevating the temperature from 215° C. to 245° C. for 120 minutes and reducing pressure from 760 torr to 0.3 torr for one hour, and melt polycondensation was further performed for one hour under a high vacuum of 0.3 torr or less.

When torque is applied to a stirrer reached a desired level, the reaction was stopped, followed by discharging using a nitrogen pressure, stranding, cooling and pelletization. A melt flow index (MFI) of the resin TPEE-B thus obtained, measured at 230° C. and a load of 2.16 kg in accordance with ASTM D-1238, were 15 g/10 min.

The pellet obtained by melt polycondensation was added to a rotary reactor, pressure was decreased to 0.3 torr and solid polymerization was performed while heating and rotating at a temperature of 170 to 180° C. for about 15 to about 20 hours.

The TPEE-A obtained by solid polymerization had a melting point of 205° C., a Shore hardness of 42 D, and a melt flow index (MFI) measured at 230° C. and a load of 2.16 kg in accordance with ASTM D-1238, of 5 g/10 min.

Compounding

The thermoplastic polyester elastomer resin composition according to the present invention was obtained by adding at least one additive such as chain extension/hydrolysis resistance agent (or chain extender), antioxidant, light stabilizer or carbon black master batch to the TPEE and PBT described above, and performing reaction extrusion while melting and mixing using a twin-screw extruder. A pellet was obtained using a pelletizer, sufficiently dried in a dehumidification drier or a hot air drier and subjected to injection molding and physical properties thereof were measured.

Examples and Comparative Examples

Resins and additives were mixed in contents described in the following Table 1, reaction extrusion was performed using a twin-screw extruder (diameter: 40 mm, L/D=40) at 230 to 260° C. at a flow rate of 40 kg/h and at a screw speed of 250 rpm, and the extruded melted substance was cooled by passing through a cooling bath and was pelletized to obtain a thermoplastic polyester elastomer resin composition as a pellet.

A specimen of the prepared pellet-type thermoplastic polyester elastomer resin composition was obtained using an injection molding machine and physical properties of the specimen were measured in accordance with the following method and results are shown in the following Table 1.

Surface hardness: Shore D-type hardness was measured in accordance with ASTM D2240.

Melt index: measured in accordance with ASTM D1238 after retention for 4 minutes at 230° C. and a load of 5 kg.

Tensile strength and tensile elongation: tensile strength and tensile elongation of specimen obtained by injection molding in accordance with DIN 53504-85 STAB 2 was measured at room temperature and tensile strength ($kg/cm^2$) and tensile elongation (%) were measured at a break point.

Long-term heat aging resistance: specimen injection-molded in accordance with DIN 53504-85 STAB 2 was added to a 150° C. gear oven allowing for air circulation and rotation, allowed to stand for 300 hours and allowed to stand at room temperature for about 24 hours, and tensile strength and elongation were then measured.

Blow molding property: Parison drawdown (sagging) and thickness uniformity were observed by the naked eye during blow molding and blow molding property was evaluated as ◉ (very good), ○ (good), △ (drawdown, but molding is possible) or x (molding is impossible due to drawdown or mechanical overload) by synthetical decision.

Volatile organic compound (TVOC) content: resin composition sample was added to a GC/MS machine, volatile organic compounds were evaporated at 240° C. for 10 minutes and quantitative analysis was performed.

Production of gel: melt resin was molded into a film with a thickness of about 50 to about 100 μm at 230 to 250° C. by T die extrusion, and a degree of gel production on the surface of the film was evaluated based on ○ (no production of gel), △ (production of a small amount of gel), x (production of great amount of gel).

TABLE 1

|  |  |  | Examples | | | Comparative Examples | | | | | |
|---|---|---|---|---|---|---|---|---|---|---|---|
| Items |  |  | 1 | 2 | 3 | 1 | 2 | 3 | 4 | 5 | 6 |
| Composition | Resin | TPEE-A[1] | 94 | 93 | 92 | 94 | 93 | 92 | 94.5 | 94.5 | 96 |
|  |  | EOR-GMA[2] | 3 | 4 | 5 | — | — | — | — | — | — |
|  |  | E/VA/GMA[3] | — | — | — | 3 | 4 | 5 | 1 | 1 | 1 |

TABLE 1-continued

|  | Items |  | Examples 1 | Examples 2 | Examples 3 | Comparative Examples 1 | Comparative Examples 2 | Comparative Examples 3 | Comparative Examples 4 | Comparative Examples 5 | Comparative Examples 6 |
|---|---|---|---|---|---|---|---|---|---|---|---|
|  | Additive | CE-1[4] | — | — | — | — | — | — | — | — | — |
|  |  | CE-2[5] | — | — | — | — | — | — | — | 1.5 | — |
|  |  | CE-3[6] | — | — | — | — | — | — | 1.5 | — | — |
|  |  | Other additives | 3 | 3 | 3 | 3 | 3 | 3 | 3 | 3 | 3 |
|  | Total (wt %) |  | 100 | 100 | 100 | 100 | 100 | 100 | 100 | 100 | 100 |
| Physical properties | Surface hardness (shore D) |  | 42 | 39 | 39 | 39 | 39 | 39 | 39 | 39 | 39 |
|  | Melt index (g/10 min) (upon retention for 4 minutes) |  | 8 | 5 | 2 | 15 | 12 | 8 | 12 | 13 | 20 |
|  | Tensile strength (kg/cm$^2$) |  | 350 | 340 | 340 | 330 | 300 | 280 | 325 | 330 | 325 |
|  | Tensile elongation (%) |  | 800 | 780 | 780 | 850 | 800 | 750 | 710 | 710 | 620 |
|  | Blow molding property |  | ○ | ◎ | ◎ | X | ○ | ○ | X | X | X |
|  | Volatile organic compound content (TVOC, ppm) |  | 27 | 35 | 33 | 43 | 35 | 37 | 80 | 64 | 44 |
|  | Production of gel |  | ○ | ○ | ○ | ○ | X | Δ | Δ | ○ | ○ |

(1) TPEE-A: Polyetherester elastomer having been subjected to melt polymerization/solid polymerization, hardness: 42 D, melting point: 205° C., melt index: 5 g/10 min (230° C., 2.16 kg), production company: LG Chem. Ltd.

(2) EOR-GMA: glycidyl methacrylate (GMA: 8 to 10% by weight)-grafted ethylene-octene copolymer resin, production company: Shenyang Ketong Plastics Co. Ltd.

(3) E/VA/GMA: ethylene-vinyl acetate-glycidyl methacrylate (GMA content: 12%) copolymer resin, production company: Sumitomo Chemical Co., Ltd.

(4) CE-1: chain extender (styrene-acrylate copolymer), production company: BASF (5) CE-2: chain extender (polycarbodiimide compound), production company: Nisshinbo Chemical Inc.

(6) CE-3: chain extender (para-phenylene diisocyanate), production company: DuPont (7) Other additives:
Heat stabilizer, antioxidant: N,N-hexane-1,6-diylbis(3,5-di-tert-butyl-4-hydroxyphenyl propionamide) (production company: BASF), 4,4'-bis(α,α-dimethylbenzyl) diphenylamine (production company: Crompton), poly[[6-(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino] (production company: BASF)

As can be seen from Table 1, thermoplastic polyetherester elastomer resin compositions of Examples 1 to 3 exhibited superior blow molding properties (melt viscosity and parison stability), had a low volatile organic compound content and caused no gelation during molding.

Meanwhile, Comparative Examples 1, 4, 5 and 6 were not suitable for blow molding due to greatly low parison stability. In particular, Comparative Example 2 containing 4% of E/VA/GMA did not exhibit uniform appearance quality due to creation of gel, and Comparative Example 3 containing 5% of E/VA/GMA exhibited poor long-term heat resistance (tensile strength and elongation), thus causing problems associated with durability of automobiles as compared to Examples 1 to 3.

Comparative Example 5 using polycarbodiimide as a chain extender may have problems associated with operation environment caused by odor during molding operation due to considerably high volatile organic compound (TVOC) content.

For reference, results according to polymerization method of the copolyetherester elastomer resin were further tested.

Additional Experimental Example 1

The same experiment as in Example 1 was repeated, except that, in Example 1, 94.5% by weight of TPEE-B was used instead of 94% by weight of TPEE-A and 1% by weight of E/VA/GMA was used instead of 3% by weight of EOR-GMA.

For reference, a polyetherester elastomer product prepared by melt polymerization (hardness: 42 D, melting point: 195° C., flow melt index: 15 g/10 min (230° C., 2.16 kg), production company: LG Chem. Ltd.) was used as the TPEE-B. As a result, it was seen that Shore hardness was 39 D, melt index was 13 g/10 min, tensile strength was 335 kg/cm$^2$, tensile elongation was 720%, blow molding properties were evaluated as x, the volatile organic compound content was 30 ppm or less, and gelation was not generated.

The invention claimed is:

1. A thermoplastic polyester elastomer resin composition comprising:
   90% to 97% by weight of a copolyetherester elastomer resin; and
   2% to 5% by weight of a glycidyl-modified ethylene-octene copolymer (EOR-GMA).

2. The thermoplastic polyester elastomer resin composition according to claim 1, wherein the copolyetherester elastomer resin is obtained by melt polymerization and solid polymerization.

3. The thermoplastic polyester elastomer resin composition according to claim 1, wherein the copolyetherester elastomer resin has a melt flow index (MFI) of 1 to 10 g/10 min (230° C., 2.16 kg).

4. The thermoplastic polyester elastomer resin composition according to claim 1, wherein the copolyetherester elastomer resin has a Shore hardness of 35 to 50 D.

5. The thermoplastic polyester elastomer resin composition according to claim 1, wherein the copolyetherester elastomer resin is obtained using poly(tetramethylene ether)glycol having a number average molecular weight (Mn) of 600 to 3,000 g/mol.

6. The thermoplastic polyester elastomer resin composition according to claim 1, wherein the copolyetherester elastomer resin is obtained using polypropylene glycol having a number average molecular weight (Mn) of 2,000 to 3,000 g/mol and an end-capped with ethylene oxide.

7. The thermoplastic polyester elastomer resin composition according to claim 1, wherein the glycidyl-modified ethylene-octene copolymer (EOR-GMA) is an ethylene-octene copolymer modified by grafting with glycidyl methacrylate.

8. The thermoplastic polyester elastomer resin composition according to claim 7, wherein a graft content of the glycidyl-modified ethylene-octene copolymer is 8 to 20% by weight.

9. The thermoplastic polyester elastomer resin composition according to claim 1, further comprising 1 to 5% by weight of an anti-heat aging agent.

10. The thermoplastic polyester elastomer resin composition according to claim 9, wherein the anti-heat aging agent comprises at least one selected from the group consisting of a hindered phenol-based antioxidant, a diphenylamine-based antioxidant, a metal complex compound, an antioxidant and a hindered amine-based light stabilizer.

11. The thermoplastic polyester elastomer resin composition according to claim 1, further comprising a polyakylene dicarboxylate resin.

12. A molded article produced using the thermoplastic polyester elastomer resin composition according to claim 1.

13. The molded article according to claim 12, wherein the molded article is obtained by blow molding or extrusion molding.

14. The thermoplastic polyester elastomer resin composition according to claim 2, wherein the copolyetherester elastomer resin has a melt flow index (MFI) of 1 to 10 g/10 min (230° C., 2.16 kg).

15. The thermoplastic polyester elastomer resin composition according to claim 2, wherein the copolyetherester elastomer resin has a Shore hardness of 35 to 50 D.

16. The thermoplastic polyester elastomer resin composition according to claim 2, wherein the copolyetherester elastomer resin is obtained using poly(tetramethylene ether)glycol having a number average molecular weight (Mn) of 600 to 3,000 g/mol.

17. The thermoplastic polyester elastomer resin composition according to claim 2, wherein the copolyetherester elastomer resin is obtained using polypropylene glycol having a number average molecular weight (Mn) of 2,000 to 3,000 g/mol and an end-capped with ethylene oxide.

* * * * *